Patented July 28, 1931

1,816,303

UNITED STATES PATENT OFFICE

CARL THEODOR THORSSELL AND AUGUST KRISTENSSON, OF CASSEL, GERMANY

PROCESS FOR THE PRODUCTION OF POTASSIUM NITRATE

No Drawing. Application filed February 29, 1928, Serial No. 258,150, and in Germany March 16, 1927.

The production of alkali nitrates by the reaction of chlorides with nitric acid according to the following equation $$KCl + HNO_3 = KNO_3 + HCl$$

is in itself well known.

It is stated in German Patent 242,014 of July 3, 1910, that the free hydrochloric acid formed should be distilled off under a vacuum from the reaction mixture obtained in this way. Up to the present however it has not been possible by this means to arrive at a method of industrial value. The main difficulty lay in the nitrogen losses being too great, as free nitric acid or saltpetre very readily decomposes in the presence of hydrochloric acid.

$$HNO_3 + 3HCl = NOCl + Cl_2 + 2H_2O$$

The reaction of potassium chloride with nitric acid to form potassium nitrate and hydrochloric acid, takes place in the present process as prescribed in the German Patent 242,014 referred to above. According to this patent use can be made of nitric acid of up to 35% $HNO_3$, which has been confirmed in the main by careful experiments.

In such a case when the reaction has ended, a pulp is formed, the substance at the bottom of this pulp consisting of pure potassium nitrate, provided naturally that the proper proportions of potassium chloride and nitric acid are employed.

When mixing potassium chloride with nitric acid according to the patent mentioned above, the temperature rises by about 20° C.; it must not rise above 35-40° however because if heated to a higher temperature, the hydrochloric acid begins to escape.

The resulting solution consists mainly of hydrochloric acid with potassium nitrate dissolved therein and potassium chloride or free nitric acid, according to the proportions selected from the outset for the reacting substances.

The resulting potassium nitrate is separated off and the mother liquor is worked up as follows; this treatment of the mother liquor is the object of the present invention.

As nitrogen forms by far the most valuable constituent of the mother liquor, the treatment is preeminently such that the nitrogen losses are as small as possible.

According to the present process the mother liquor after the first reaction mixture is freed from nitrogen by a reducing process, if desired after a preliminary treatment for the purpose of reducing its nitrogen content, as described below.

By this means it is possible to recover almost completely the nitrogen in the mother liquor.

The amount of nitrogen present in the mother liquor in the form of potassium nitrate and nitric acid is converted by reduction with a suitable reducing agent into nitric oxide (NO) and recovered as such. The reduction is in itself quantitative. The NO formed in this way is oxidized to a further extent by known methods with air or oxygen and converted by water into nitric acid.

The process can be further improved to a considerable extent by the liquor being freed from further quantities of $KNO_3$ by cooling after the separation of the potassium nitrate before this reduction. For this purpose the liquor is cooled as intensely as possible, first with cooling water, then with cold mother liquor from a preceding operation and finally by artificial cooling.

The degree of cooling employed is limited by considerations of economy. In order to obtain very low temperatures, solid ice can be added to the solution obtained in the present case. A temperature of −20° and lower is then obtained. When ice is added, the quantity of water employed at the outset must be correspondingly less.

Experiments have shown that when cooling to −5° C. about 85% of the total quantity of potassium nitrate are separated off, at −17° C about 89% and at lower temperatures a correspondingly greater amount.

This process is further assisted by working with a certain excess of $HNO_3$ and adding further KCl during the mixing with ice, the result of which is that the solution formed contains comparatively less N and more HCl.

The salt separated out in this way, which consists in practice of a mixture of $KNO_3$ and KCl is isolated from the mother liquor and subjected to the first conversion process of $HNO_3$ with KCl.

The cold mother liquor, as stated above, is first of all used to pre-cool the first mother liquor.

In German Patent 391,011 it has been proposed to distil off the hydrochloric acid from the mother liquor from the first reaction mixture, if desired after cooling the same. This entails unavoidable nitrogen losses however, insofar as nitrous gases escape with the hydrochloric acid gases, from which they have to be separated by suitable absorption agents.

According to the present process the mother liquor is first of all completely freed from nitrogen by reduction and only then is the free hydrochloric acid contained therein obtained if desired by distillation.

The basis of this process is as stated above, the reduction of nitric acid with a suitable reducing agent to nitric oxide (NO). Ferrous chloride is a suitable reducing agent for this purpose.

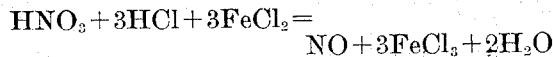
$$HNO_3 + 3HCl + 3FeCl_2 = NO + 3FeCl_3 + 2H_2O$$

The NO formed in this manner is re-converted into nitric acid according to known methods by means of air or oxygen and water in absorption towers.

Ferrous chloride is prepared again from the ferric chloride by reduction with iron.

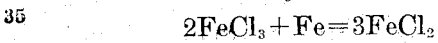
$$2FeCl_3 + Fe = 3FeCl_2$$

In addition to being formed by reduction with ferrous chloride, nitric oxide is formed when certain metals, for instance copper, are dissolved in nitric acid. Copper can also be dissolved therefore in the mother liquor in which case in the presence of hydrochloric acid copper chloride is formed together with nitric oxide.

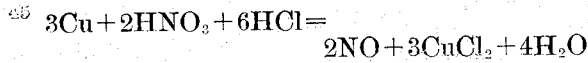
$$3Cu + 2HNO_3 + 6HCl = 2NO + 3CuCl_2 + 4H_2O$$

The copper can be readily obtained, by introducing copper chloride into boiling alkali liquor, as copper oxide, which can be easily reduced subsequently to metallic copper.

When ferrous chloride is used as reducing agent, the process is carried out as follows:—

The mother liquor is if necessary, preheated and mixed with an exactly proportioned amount of ferrous chloride solution. Any excess of the latter is detrimental, because nitric oxide remains dissolved therein and cannot be readily expelled.

The mixture having a temperature of 60–70° C. is heated to boiling point either in a column or in a retort by the direct action of steam, nitric oxide being driven off. If a retort is used it is advisable to add somewhat less than the calculated quantity of ferrous chloride at the very beginning and to introduce the remainder slowly after the formation of nitric oxide has ended. It has been found that an excess of nitric acid considerably accelerates the generation of gas. It is possible to drive off the whole amount of nitrogen except for a very small residue, as nitric oxide.

Experiments have shown that less than 1% of the nitrogen present in the mother liquor is left behind. Nitric oxide is insoluble in water and lye, so that any hydrochloric acid mixed therewith can be easily eliminated before NO is mixed with air for the purpose of producing nitric acid.

The solution flowing off, which is free from nitrogen, and contains chiefly ferric chloride together with hydrochloric acid and potassium chloride can be further treated in various ways.

If the quantity of hydrochloric acid is small, in which case the quantity of potassium chloride is also reduced by a suitable method of working, ⅓ of the solution is drained off and ⅔ treated with iron turnings or the like, clarified and used again in the form of a solution of ferrous chloride. If the amount of hydrochloric acid and potassium chloride is larger, the hydrochloric acid can first be driven off and the ferric chloride reduced again to ferrous chloride by iron, hydrogen sulphide, sulphurous acid or any other reducing agent, the potassium being able to be recovered.

Having now particularly described and ascertained the nature of our said invention and in what manner the same is to be performed, we declare that what we claim is:—

1. The method of recovering nitric acid from mother liquors containing the same and resulting from the conversion of potassium chloride to potassium nitrate by reacting the former with nitric acid and removing the potassium nitrate formed which comprises treating the mother liquor with a reducing agent having the property of reducing nitric acid to nitric oxide, removing the nitric oxide and converting the liberated nitric oxide to nitric acid.

2. The method of recovering nitric acid from mother liquors containing the same and resulting from the conversion of potassium chloride to potassium nitrate by reacting the former with nitric acid and removing the potassium nitrate formed which comprises treating the mother liquor with ferrous chloride, removing the nitric oxide from the solution and converting the liberated nitric oxide to nitric acid.

3. The method of preparing potassium nitrate which comprises treating potassium chloride with an excess of nitric acid, cooling the resulting reaction product to crystallize out the potassium nitrate formed, separating off the potassium nitrate, adding a reducing agent to the mother liquor, having the property of reducing nitric acid to nitric oxide, removing the nitric oxide from the solution, and then converting the so-formed nitric oxide into nitric acid for reuse in the process.

4. The method of preparing potassium nitrate which comprises treating potassium chloride with an excess of nitric acid, cooling the resulting reaction product to crystallize out the potassium nitrate formed, adding potassium chloride to the mother liquor to precipitate further quantities of potassium nitrate, separating off the potassium nitrate, adding a reducing agent to the mother liquor, said agent having the property of reducing nitric acid to nitric oxide, removing the nitric oxide from the solution, and then converting the so-formed nitric oxide into nitric acid for reuse in the process.

5. The method of preparing potassium nitrate which comprises treating potassium chloride with an excess of nitric acid, cooling the resulting reaction product to crystallize out the potassium nitrate formed, separating off the potassium nitrate, adding ferrous chloride removing the nitric oxide from the solution, and then converting the so-formed nitric oxide into nitric acid for reuse in the process.

6. The method of preparing potassium nitrate which comprises treating potassium chloride with an excess of nitric acid, cooling the resulting reaction product to crystallize out the potassium nitrate formed, adding potassium chloride to the mother liquor to precipitate further quantities of potassium nitrate, separating off the potassium nitrate, adding ferrous chloride, removing the nitrous oxide from the solution, and then converting the so-formed nitric oxide into nitric acid for reuse in the process.

7. A process for the production of potassium nitrate by the reaction of potassium chloride with nitric acid in concentration, consisting in freeing the mother liquor, after the separation of the potassium nitrate, from its nitrogen content by reduction of the nitrogen compounds contained therein, removing the liberated NO from the solution and subsequently converting the obtained NO into nitric acid.

8. A process according to claim 7, wherein a certain excess of nitric acid is used and the mother liquor, before it is subjected to said reduction, is freed by intense cooling from further quantities of potassium nitrate by the addition of potassium chloride.

9. A process according to claim 7, wherein ferrous chloride is used as the reducing agent.

10. A process of producing potassium nitrate according to claim 7 wherein ferrous chloride is used as the reducing agent and two-thirds of the solution free from nitrogen oxide obtained after reduction is separated and the ferric chloride contained therein is again reduced to ferrous chloride, with suitable agents selected from a group consisting of iron, hydrogen, sulphide and sulphurous oxide, in order to be used for the next operation for reducing nitric acid in the mother liquor.

In testimony whereof we have signed our names to this specification.

CARL THEODOR THORSSELL.
AUGUST KRISTENSSON.